United States Patent
Dieckmann et al.

(10) Patent No.: US 12,275,357 B2
(45) Date of Patent: Apr. 15, 2025

(54) 3D KNITTED FABRIC, INTERIOR COMPONENT AND MOTOR VEHICLE

(71) Applicant: Bayerische Motoren Werke Aktiengesellschaft, Munich (DE)

(72) Inventors: Maike Dieckmann, Landshut (DE); Johann Gasslhuber, Buch am Erlbach (DE); Stefan Koensgen, Landshut (DE); Joachim Melzig, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 298 days.

(21) Appl. No.: 17/968,491

(22) Filed: Oct. 18, 2022

(65) Prior Publication Data
US 2023/0122699 A1 Apr. 20, 2023

(30) Foreign Application Priority Data
Oct. 19, 2021 (DE) ...................... 10 2021 127 046.4

(51) Int. Cl.
*B60R 13/02* (2006.01)
*D04B 1/22* (2006.01)
*D04B 21/20* (2006.01)

(52) U.S. Cl.
CPC ...... *B60R 13/0212* (2013.01); *B60R 13/0243* (2013.01); *B60R 13/0256* (2013.01); *B60R 13/0262* (2013.01); *D04B 1/22* (2013.01); *D04B 21/20* (2013.01); *D10B 2505/12* (2013.01); *Y10T 428/24008* (2015.01)

(58) Field of Classification Search
None
See application file for complete search history.

(56) References Cited

U.S. PATENT DOCUMENTS

| | | | |
|---|---|---|---|
| 2,698,009 A | * 12/1954 | Cusick | D06C 29/00 28/163 |
| 5,711,169 A | 1/1998 | Leeke et al. | |
| 2014/0000319 A1 | 1/2014 | Mueller et al. | |

FOREIGN PATENT DOCUMENTS

| | | |
|---|---|---|
| DE | 696 28 223 T2 | 7/2004 |
| DE | 20 2006 002 470 U1 | 5/2006 |
| DE | 10 2011 075 720 A1 | 11/2012 |
| DE | 10 2011 114 974 A1 | 4/2013 |
| DE | 10 2012 105 134 A1 | 12/2013 |
| DE | 10 2018 103 923 A1 | 8/2019 |

OTHER PUBLICATIONS

Machine translation of DE102018103923A1 (Year: 2024).*
German-language Search Report issued in German Application No. 10 2021 127 046.4 dated Jun. 29, 2022 with partial English translation (10 pages).

* cited by examiner

*Primary Examiner* — Alexander S Thomas
(74) *Attorney, Agent, or Firm* — Crowell & Moring LLP

(57) ABSTRACT

A 3D knitted fabric for an interior component of a motor vehicle has a front visible side and a rear side, the front visible side and the rear side being arranged on opposite sides of the 3D knitted fabric, and a multiplicity of fastening devices, the multiplicity of fastening devices being arranged on the rear side. The multiplicity of fastening devices are designed for the releasable fastening of the 3D knitted fabric to a carrier device of the interior component. Such an interior component having the at least one 3D knitted fabric and at least one carrier device is provided for a motor vehicle.

9 Claims, 3 Drawing Sheets

3D KNITTED FABRIC, INTERIOR COMPONENT AND MOTOR VEHICLE

CROSS REFERENCE TO RELATED APPLICATION

This application claims priority under 35 U.S.C. § 119 from German Patent Application No. 10 2021 127 046.4, filed Oct. 19, 2021, the entire disclosure of which is herein expressly incorporated by reference.

BACKGROUND AND SUMMARY OF THE INVENTION

The present invention relates to a 3D knitted fabric for an interior component of a motor vehicle. The invention also relates to an interior component for a motor vehicle, having at least one 3D knitted fabric and at least one carrier device, and also to a motor vehicle.

In motor vehicle construction, in particular in interior construction, textiles have hitherto been used to the extent that they are cut out of 2D roll goods and further processed. Furthermore, in motor vehicle construction, in particular in interior construction, surface materials in the interior are firmly adhered, laminated and/or foamed on instrument panels, door linings and/or other interior components, for example. The surfaces are thus disadvantageously connected to the carrier device in a non-releasable manner. Separation into materials of the same type at the end of the vehicle service life is not possible. Interior components, in particular with surface-laminated carrier devices, are composed for the most part of a different material mix. The known production methods and the generally materially bonded connection do not make it possible to perform separation into materials of the same type at the end of the vehicle service life, as a result of which the materials used cannot be recycled efficiently, if at all. Disadvantageously for cost and material efficiency, plastics waste is generally produced, which has to be recycled thermally.

It is therefore an object of the present invention to remedy or at least partially remedy the above-described disadvantages in the prior art. In particular, it is an object of the invention to provide a 3D knitted fabric for an interior component of a motor vehicle, by means of which releasable fastening of the 3D knitted fabric to a carrier device of the interior component is made possible in a particularly simple manner. In particular, it is also the object of the invention to provide an interior component and a motor vehicle.

The aforementioned object is achieved by a 3D knitted fabric, by an interior component, and by a motor vehicle, having the features of the independent claims. Further advantages and details of the invention will emerge from the dependent claims, from the description and from the drawings. Here, features that are described in conjunction with the 3D knitted fabric according to the invention self-evidently also apply in conjunction with the interior component according to the invention and the motor vehicle according to the invention, and vice versa in each case, such that reference is always or can always be made reciprocally with respect to the disclosure of the individual aspects of the invention.

According to a first aspect of the invention, the object is achieved by a 3D knitted fabric for an interior component of a motor vehicle. The 3D knitted fabric has a front visible side and a rear side, the front visible side and the rear side being arranged on opposite sides of the 3D knitted fabric, and a multiplicity of fastening devices, the multiplicity of fastening devices being arranged on the rear side. The multiplicity of fastening devices are designed for the releasable fastening of the 3D knitted fabric to a carrier device of the interior component.

A knitted fabric should be understood to mean an areal textile in the context of the invention. The knitted fabric is preferably formed from a front-side knitted fabric and a rear-side knitted fabric, the front-side knitted fabric and the rear-side knitted fabric preferably each being produced from a yarn or monofilament. The yarn according to the invention is in turn formed from a multiplicity of filaments. By way of example, a yarn comprises 50 to 100, in particular 70, filaments. The filaments are preferably manufactured from a plastic and/or aramid and/or a similar material. A 3D knitted fabric is manufactured in a three-dimensional manner by way of its special production process and consequently differs from a two-dimensional, flat knitted fabric both in terms of handling, manufacturing and the requirements for fastening and processing. A 3D knitted fabric preferably has closer stitches in certain portions and wider stitches in certain portions. As an alternative or in addition, a 3D knitted fabric is formed in a three-dimensional manner by way of varying numbers of stitches in adjacent stitch courses. A 3D knitted fabric is generally manufactured for the cover over a carrier component and advantageously permits processing with reduced offcuts or even without offcuts. Preferably, in contrast to an interior component with a 2D knitted fabric and/or 2D textile, the 3D knitted fabric according to the invention is designed in a seam-free manner.

In the context of the invention, the front visible side of the 3D knitted fabric should be understood to mean that side of the 3D knitted fabric which faces the motor vehicle interior in the installed state. The rear side is correspondingly arranged on an opposite side of the 3D knitted fabric and faces away from the motor vehicle interior in the installed state. In the installed state, the 3D knitted fabric is releasably fastened to the carrier device of the interior component, and the interior component is arranged, fastened and/or installed in the motor vehicle.

The fastening devices according to the invention are designed as devices for the releasable fastening of the 3D knitted fabric to a carrier device of the interior component. The multiplicity of fastening devices should preferably be understood to mean at least one fastening device per 1000 $cm^2$ of the rear side of the 3D knitted fabric. Particularly preferably, the 3D knitted fabric has at least one fastening device per 500, 200 or 100 $cm^2$ of the rear side of the 3D knitted fabric. Preferably, according to the invention, the greater the number of fastening devices arranged on the rear side of the 3D knitted fabric, the smaller and/or thinner the design of the fastening devices is. The fastening devices serve, in a manner essential to the invention, for a releasable fastening between the 3D knitted fabric and the at least one carrier device of the interior component. In the context of the invention, a releasable fastening of the 3D knitted fabric to a carrier device of the interior component should be understood to mean a form-fitting and/or force-fitting connection and/or a multiplicity of connections between the multiplicity of fastening devices and the carrier device of the interior component. The connections are each of individually or jointly releasable design, the releasability preferably being realized in a mechanical manner. The releasability is preferably made possible by a release mechanism and/or by a flexibility, movability and/or extensibility of the material and/or of the constructional configuration of the multiplicity of fastening devices and/or of the carrier device. Possible constructional configurations of the multiplicity of fastening devices will be described in the paragraphs that follow.

A 3D knitted fabric designed in this way for an interior component of a motor vehicle is particularly advantageous, since a releasable fastening of the 3D knitted fabric to the carrier device of the interior component is made possible in a particularly simple manner. Furthermore, a 3D knitted fabric designed in this way advantageously makes it possible for the 3D knitted fabric to be able to be applied to the carrier device in a releasable, in particular exchangeable, manner, and thus the materials can be separated into materials of the same type again after the components have been removed, whereby said materials are suitable for reuse. Advantageously, due to the use of the 3D knitted fabric according to the invention, the components and/or the connections between the components, in particular the 3D knitted fabric and the carrier device of the interior component, are free from adhesive.

According to a preferred further development of the invention, provision may be made in the case of a 3D knitted fabric for the multiplicity of fastening devices to be arranged in one part with the 3D knitted fabric on the rear side. A one-part configuration of the multiplicity of fastening devices with the 3D knitted fabric is particularly advantageous, since said fastening devices are consequently connected to the 3D knitted fabric in a non-releasable manner and can be configured with little effort in terms of time, manufacturing and construction. The one-part configuration of the multiplicity of fastening devices with the 3D knitted fabric consequently makes it easier for the multiplicity of fastening devices to be arranged on, and fastened to, the 3D knitted fabric, since these operations are already effected during the manufacture of the 3D knitted fabric. In an illustrative description, the multiplicity of fastening devices are thus designed as a one-part constituent of the 3D knitted fabric. Preferably, the multiplicity of fastening devices are formed at least in certain portions, in particular completely and/or exclusively, from the yarn of the 3D knitted fabric.

According to a preferred further development of the invention, provision may be made in the case of a 3D knitted fabric for the multiplicity of fastening devices to be in the form of injection-molded elements materially bonded to the 3D knitted fabric on the rear side. As an alternative or in addition to the preceding paragraph, the multiplicity of fastening devices are preferably in the form of injection-molded elements materially bonded to the 3D knitted fabric on the rear side. A materially bonded configuration of the multiplicity of fastening devices on the rear side of the 3D knitted fabric is particularly advantageous, since said fastening devices are consequently connected to the 3D knitted fabric in a non-releasable manner and can be configured with little effort in terms of time, manufacturing and construction. The manufacture of the multiplicity of fastening devices in the form of injection-molded elements advantageously requires little expenditure in terms of cost and material and also permits a stable configuration of the connection between the multiplicity of fastening devices and the 3D knitted fabric, and thus permits a reliable connection between the 3D knitted fabric and the carrier device.

According to a preferred further development of the invention, provision may be made in the case of a 3D knitted fabric for the multiplicity of fastening devices to be designed as tabs and/or as hooks. In addition or as an alternative, the fastening devices according to the invention are preferably designed as studs, plugs, sockets, barbs, snap fasteners and/or as other fastening devices. The multiplicity of fastening devices are preferably designed for releasable fastening to a multiplicity of counterpart fastening devices of the carrier device. Preferably, the multiplicity of fastening devices are formed from the yarn of the 3D knitted fabric and/or are connected to the yarn of the 3D knitted fabric. The counterpart fastening devices of the carrier device should preferably be understood to mean the counterpart of the connection to the multiplicity of fastening devices. Preferably, the counterpart fastening devices of the carrier device have a negative form or substantially a negative form of the multiplicity of fastening devices.

According to a preferred further development of the invention, provision may be made in the case of a 3D knitted fabric for the multiplicity of fastening devices to be formed from the same material as the 3D knitted fabric. Forming the multiplicity of fastening devices from the same material as the 3D knitted fabric is particularly advantageous, since a particularly stable and durable connection between the multiplicity of fastening devices and the 3D knitted fabric is made possible. Furthermore, due to the material of the multiplicity of fastening devices and the 3D knitted fabric having the same melting point, a particularly energy-efficient connection between the multiplicity of fastening devices and the 3D knitted fabric is made possible. Forming the multiplicity of fastening devices from the same material as the 3D knitted fabric also generates an advantageous transmission of force between the multiplicity of fastening devices and the 3D knitted fabric.

According to a preferred further development of the invention, provision may be made in the case of a 3D knitted fabric for the multiplicity of fastening devices to be designed for destruction-free releasable fastening to the carrier device of the interior component. It is a particularly advantageous further development of the invention if the multiplicity of fastening devices are designed for destruction-free releasable fastening to the carrier device of the interior component, since repeated use, fastening and/or repeated detachment of the 3D knitted fabric and/or the multiplicity of fastening devices from the carrier device of the interior component is made possible in a destruction-free manner. A destruction-free configuration of the releasable fastening between the multiplicity of fastening devices and the carrier device of the interior component is advantageously economical and/or efficient with respect to the expenditure in terms of material and cost. In the context of the invention, destruction-free preferably means that when fastening and/or releasing the 3D knitted fabric to and/or from the carrier device, the multiplicity of fastening devices and/or the carrier device of the interior component are/is not destroyed.

According to a preferred further development of the invention, provision may be made in the case of a 3D knitted fabric for the multiplicity of fastening devices to be configured so as to be distributed at least in certain portions uniformly or substantially uniformly on the 3D knitted fabric. A uniform distribution of the multiplicity of fastening devices on the 3D knitted fabric permits an advantageously uniform fastening of the 3D knitted fabric to the carrier device of the interior component and/or an advantageously uniform and/or tight configuration and/or visual appearance of the 3D knitted fabric on the carrier device of the interior component. In the context of the invention, a uniform distribution and/or arrangement of the multiplicity of fastening devices should preferably be understood to mean uniform distribution and/or arrangement along at least one direction of extent, in particular along two orthogonal directions of extent. In addition or as an alternative, the 3D knitted fabric has a first portion with a first number and/or density of fastening devices and a second portion with a second number and/or density of fastening devices, the first number and/or density of fastening devices being lower than the second number and/or density of fastening devices. An increased number and/or density of fastening devices is advantageous, for example, in regions of the 3D knitted fabric and/or interior component in which tight bends and/or edges are arranged and/or an enhanced fastening of the 3D knitted fabric to the carrier device is required.

According to a preferred further development of the invention, provision may be made in the case of a 3D knitted fabric for the 3D knitted fabric to have a first stitch density at least in certain portions, and a second stitch density at least in certain portions, the first stitch density being lower than the second stitch density. A 3D knitted fabric with different stitch densities advantageously makes it possible to have regions of the 3D knitted fabric with different properties. Preferably, a 3D knitted fabric with different stitch densities permits different stiffnesses, visual protection, stability and/or hold for the multiplicity of fastening devices of the 3D knitted fabric and/or of the interior component. By way of example, a lower stitch density in a hinge region is advantageous in order to permit improved movability of the 3D knitted fabric. By way of example, an increased stitch density is advantageous for the attachment and/or fastening of the multiplicity of fastening devices to the rear side of the 3D knitted fabric for the purpose of fastening the 3D knitted fabric to the carrier device of the interior component. Configuring the 3D knitted fabric with an increased stitch density at least in certain regions permits an improved steadfastness of the 3D knitted fabric in relation to frequent introduction of force and/or bending, and thus permits a longer life span of the 3D knitted fabric.

According to a second aspect of the invention, the object is achieved by an interior component for a motor vehicle. The interior component has at least one 3D knitted fabric and at least one carrier device. The at least one 3D knitted fabric is designed according to the first aspect, and the at least one 3D knitted fabric is releasably fastened to the at least one carrier device by means of the multiplicity of fastening devices. In the case of the interior component described, all of the advantages that have already been described with respect to the 3D knitted fabric according to the first aspect of the invention are produced. Preferably, the carrier device has a multiplicity of counterpart fastening devices, the counterpart fastening devices being designed for releasable fastening to the multiplicity of fastening devices. Preferably, the releasable fastening between the multiplicity of fastening devices and the carrier device is made possible only by personnel of the motor vehicle manufacturer and/or of a workshop, for example, only in the at least partially disassembled state of the interior component and/or only using tools, in particular special tools. The interior component should preferably be understood to mean at least one portion of a roof liner, of a door lining, of a cockpit fairing, in particular of an instrument panel, of an armrest, of a shift knob trim and/or of a seat cover. Further embodiments of the interior component are also contemplated and possible.

According to a third aspect of the invention, the object is achieved by a motor vehicle. The motor vehicle has at least one interior component, the at least one interior component being designed according to the second aspect. In the case of the motor vehicle described, all of the advantages that have already been described with respect to the 3D knitted fabric according to the first aspect of the invention and with respect to the interior component according to the second aspect of the invention are produced.

A 3D knitted fabric according to the invention, an interior component and a motor vehicle will be explained in more detail below with reference to drawings.

Other objects, advantages and novel features of the present invention will become apparent from the following detailed description of one or more preferred embodiments when considered in conjunction with the accompanying drawings.

Figure 1:
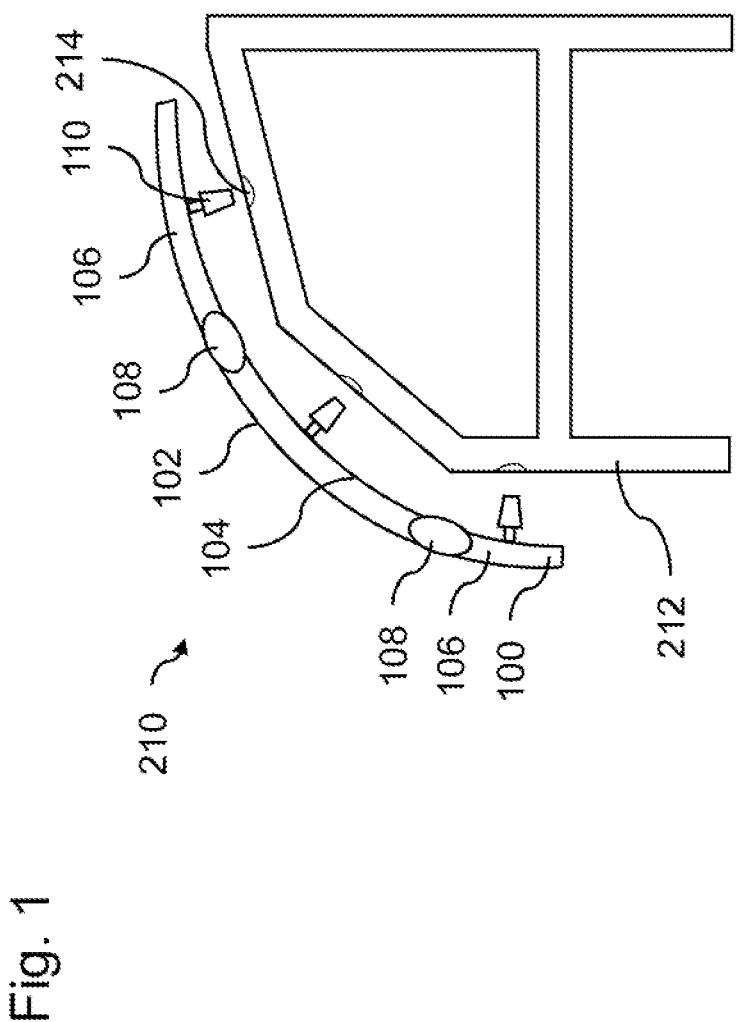
FIG. 1 is a schematic sectional side view of an interior component with a 3D knitted fabric comprising a multiplicity of fastening devices and with a carrier device comprising a multiplicity of counterpart fastening devices.
Figure 2:
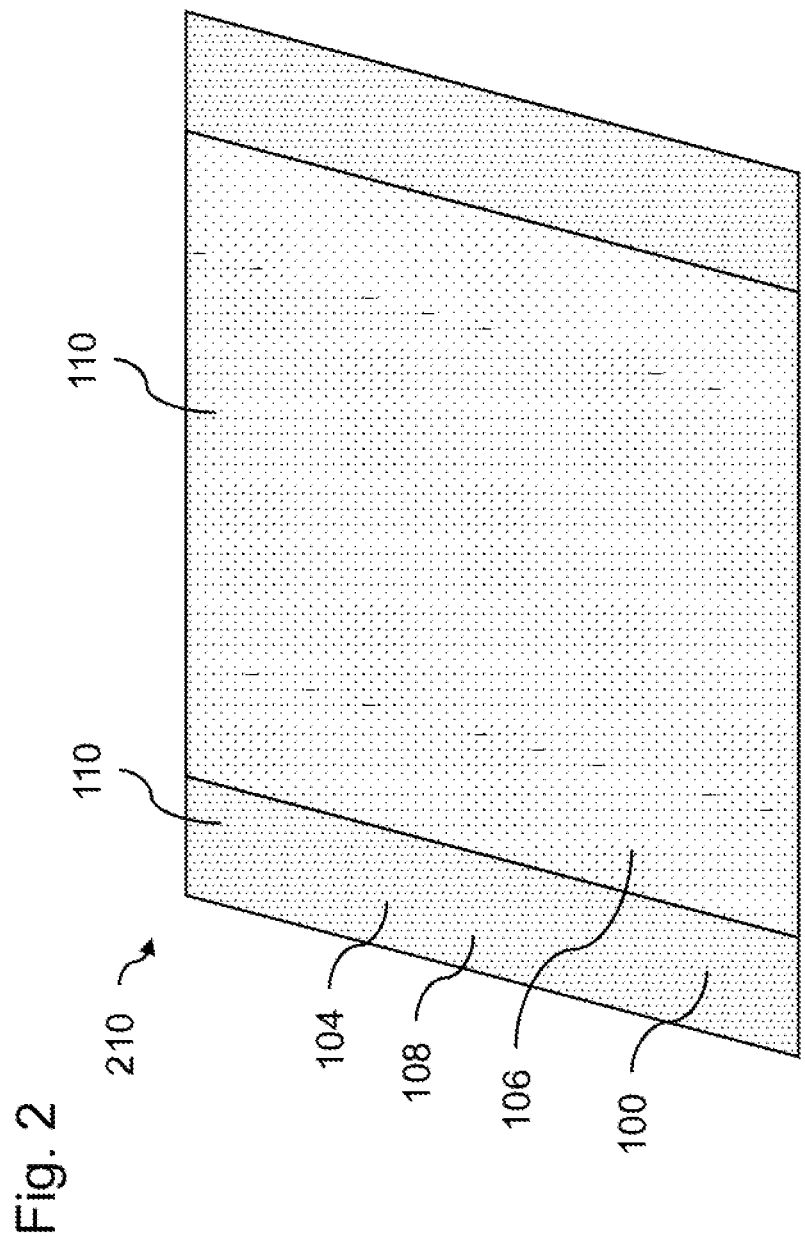
FIG. 2 is a perspective view of a rear side of a 3D knitted fabric with a first stitch density and a second stitch density.
Figure 3:
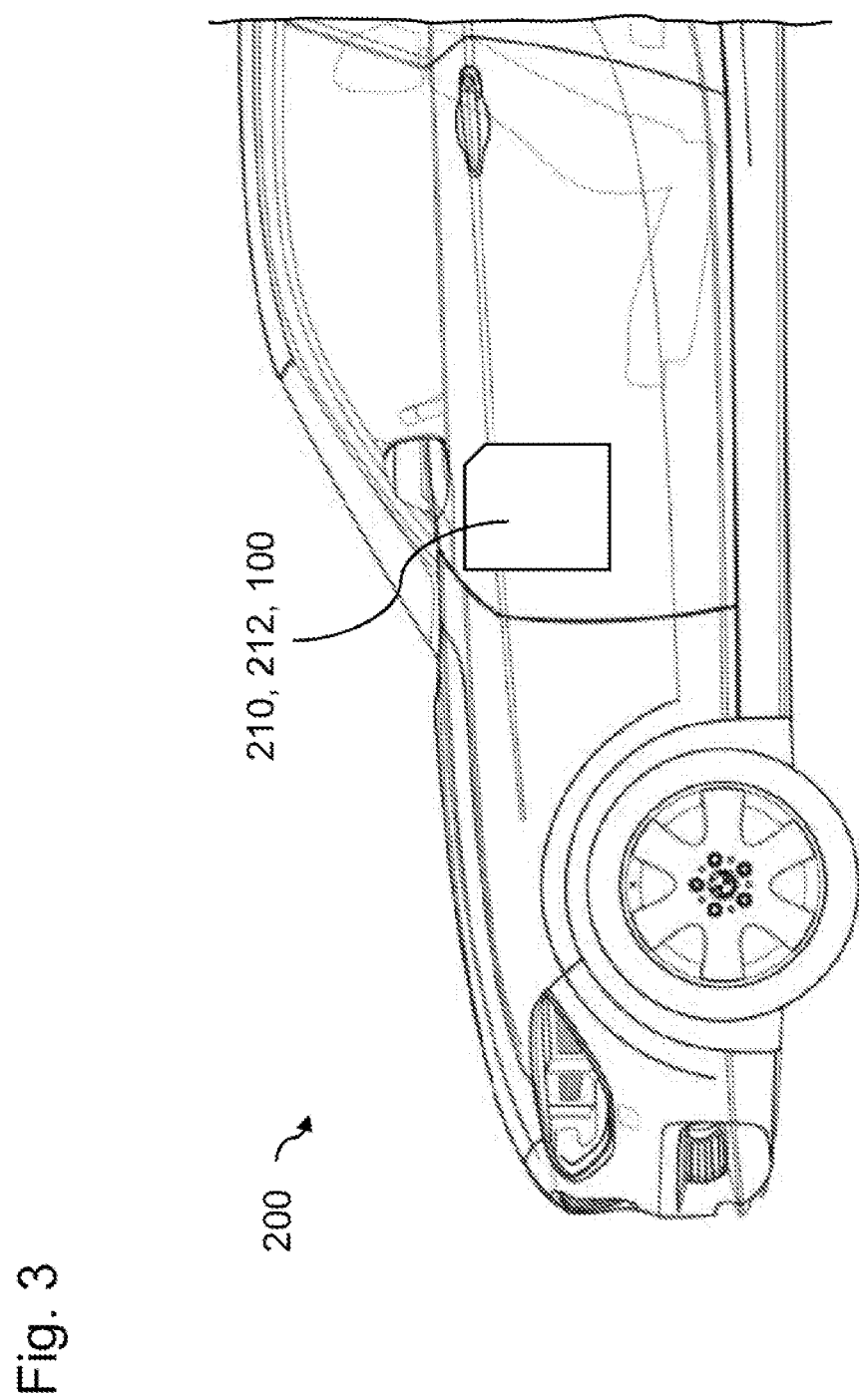
FIG. 3 is a side view of a motor vehicle with an interior component with a 3D knitted fabric and a carrier device.

Elements with identical function and mode of operation are each provided with the same reference signs in FIGS. 1 to 3.

DETAILED DESCRIPTION OF THE DRAWINGS

FIG. 1 schematically shows a sectional side view of an interior component 210 with a 3D knitted fabric 100 comprising a multiplicity of fastening devices 110 and with a carrier device 212 comprising a multiplicity of counterpart fastening devices 214. The 3D knitted fabric 100 has a front visible side 102 and a rear side 104 and a multiplicity of fastening devices 110, the front visible side 102 and the rear side 104 being arranged on opposite sides of the 3D knitted fabric 100 and the multiplicity of fastening devices 110 being arranged on the rear side 104. The multiplicity of fastening devices 110 are designed for the releasable fastening of the 3D knitted fabric 100 to a carrier device 212 of the interior component 210. The multiplicity of fastening devices 110 are arranged in one part with the 3D knitted fabric 100 on the rear side 104 of the 3D knitted fabric 100. The multiplicity of fastening devices 110 are furthermore in the form of injection-molded elements materially bonded to the 3D knitted fabric 100 on the rear side 104 of the 3D knitted fabric 100. The multiplicity of fastening devices 110 are formed from the same material as the 3D knitted fabric 100. The 3D knitted fabric 100 has a first stitch density 106 in certain portions, and a second stitch density 108 in certain portions, the first stitch density 106 being lower than the second stitch density 108. What is shown by way of example is an increased second stitch density 108 in the curved regions of the 3D knitted fabric 100, in order to permit improved visual protection for the 3D knitted fabric 100 and the interior component 210.

FIG. 2 schematically shows a perspective view of a rear side 104 of a 3D knitted fabric 100 with a first stitch density 106 and a second stitch density 108, the first stitch density 106 being lower than the second stitch density 108. The 3D knitted fabric 100 according to the invention with different stitch densities advantageously permits different stiffnesses, visual protection, stability and/or an advantageous hold for the multiplicity of fastening devices 110 of the 3D knitted fabric 100 and/or of the interior component 210. By way of example, an increased second stitch density 108 is advantageous for the attachment and/or fastening of the multiplicity of fastening devices 110 to the rear side 104 of the 3D knitted fabric 100 for the purpose of fastening the 3D knitted fabric 100 to the carrier device 212 of the interior component 210. The multiplicity of fastening devices 110 are configured so as to be distributed uniformly on the 3D knitted fabric 100, in order to permit a preferred hold of the 3D knitted fabric 100 on the carrier device 212. By way of example, the region of the increased second stitch density 108 has a likewise increased density and/or number of fastening devices 110.

FIG. 3 schematically shows a side view of a motor vehicle 200 with an interior component 210 with a 3D knitted fabric 100 and a carrier device 212. The motor vehicle 200 has, by way of example, an interior component 210, the interior component 210 being designed, likewise by way of example, as a cockpit fairing, in this case as a carrier device 212 and 3D knitted fabric 100 of an instrument panel of the motor vehicle 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 100 3D knitted fabric
102 Front visible side
104 Rear side
106 First stitch density
108 Second stitch density
110 Fastening devices
200 Motor vehicle
210 Interior component
212 Carrier device
214 Counterpart fastening devices

What is claimed is:

1. A structure of an interior trim component of a motor vehicle, comprising:
   a carrier of an instrument panel of the motor vehicle; and
   a 3D knitted fabric having a front visible side of the interior trim component and a rear side, the front visible side and the rear side being arranged on opposite sides of the 3D knitted fabric, wherein
   a multiplicity of tabs, the multiplicity of tabs being arranged on the rear side, and
   the multiplicity of tabs are associated with releasable fastening of the 3D knitted fabric to the carrier.

2. The structure according to claim 1, wherein
   the multiplicity of tabs are arranged in one part with the 3D knitted fabric on the rear side.

3. The structure according to claim 1, wherein
   the multiplicity of tabs are injection-molded fasteners materially bonded to the 3D knitted fabric on the rear side.

4. The structure according to claim 1, wherein
   the multiplicity of tabs are of a same material as the 3D knitted fabric.

5. The structure according to claim 1, wherein
   the multiplicity of tabs are configured for destruction-free releasable fastening to the carrier device of the interior trim component.

6. The structure according to claim 1, wherein
   the multiplicity of tabs are distributed uniformly on the 3D knitted fabric.

7. The structure according to claim 1, wherein
   the 3D knitted fabric has a first stitch density at least in certain portions, and a second stitch density at least in other portions, the first stitch density being lower than the second stitch density.

8. An interior trim component for a motor vehicle, comprising:
   at least one 3D knitted fabric; and
   at least one carrier device of an instrument panel of the motor vehicle, wherein
   the at least one 3D knitted fabric comprises:
      a front visible side of the interior trim component and a rear side of the 3D knitted fabric, the front visible side of the interior trim component and the rear side being arranged on opposite sides of the 3D knitted fabric; and
      a multiplicity of tabs, the multiplicity of tabs being arranged on the rear side, wherein
         the multiplicity of tabs are associated with releasable fastening of the 3D knitted fabric to the at least one carrier device of the interior trim component.

9. A motor vehicle comprising the interior trim component according to claim 8.

* * * * *